July 4, 1967  R. J. TOLMIE  3,329,881
POWER AND CONTROL MEANS FOR ELECTRICAL APPLIANCES
Filed July 27, 1964
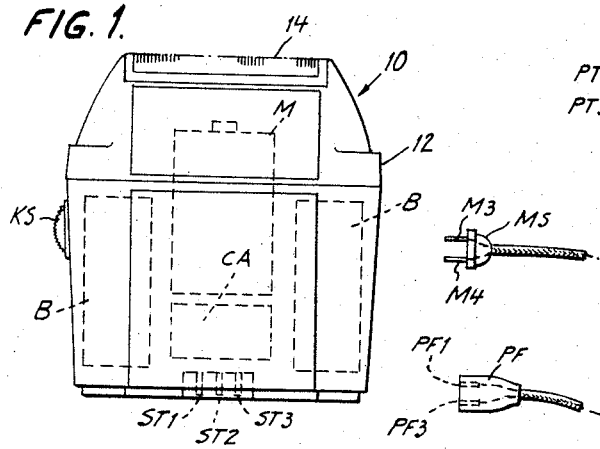
FIG. 1.
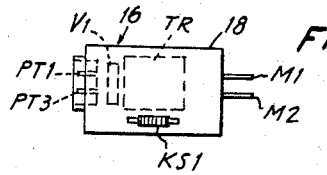
FIG. 2.
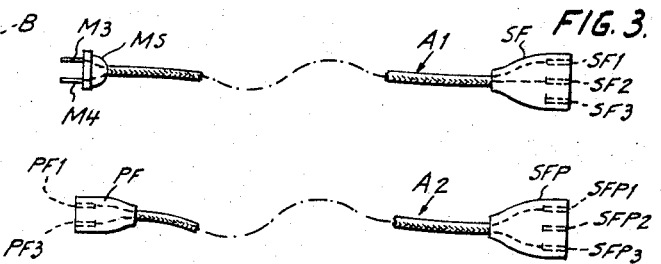
FIG. 3.
FIG. 4.
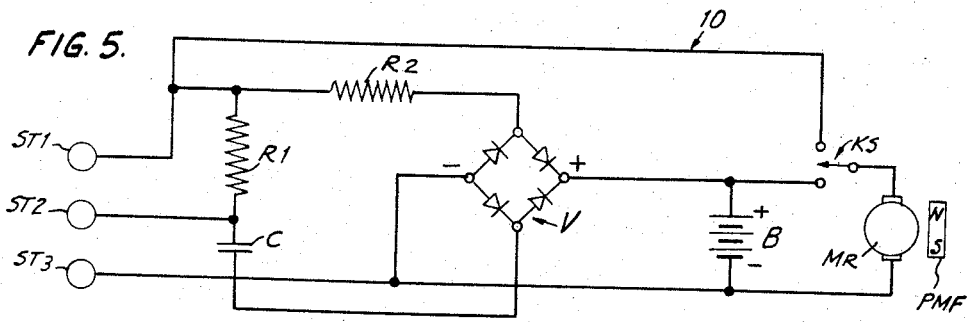
FIG. 5.
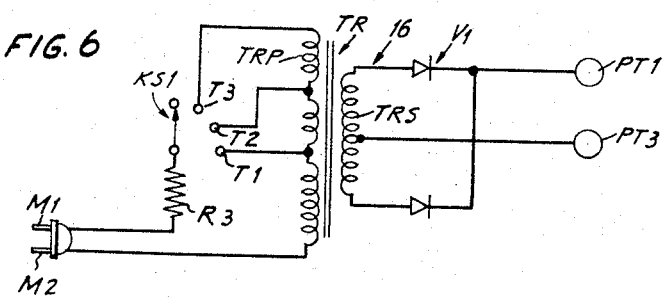
FIG. 6
INVENTOR.
ROBERT J. TOLMIE
BY
A. J. DeAngelis
ATTORNEY United States Patent Office 3,329,881
Patented July 4, 1967

3,329,881
POWER AND CONTROL MEANS FOR
ELECTRICAL APPLIANCES
Robert J. Tolmie, Fairfield, Conn., assignor to Sperry Rand Corporation, New York, N.Y., a corporation of Delaware
Filed July 27, 1964, Ser. No. 385,121
9 Claims. (Cl. 320—2)

This invention relates to power and control means for electrical appliances and especially to such means for portable appliances of relatively small size, weight and capacity adapted for low voltage actuation selectively from either a self-contained replenishable direct power source forming part of the appliance or from an external power source.

Portable appliances, such as electric dry shaver apparatus, having a driving motor, a manual switch and a rechargeable battery mounted in a shaver container for portable use, are already well known in the art. It is desirable to equip such portable appliances with charging apparatus for the battery, which apparatus is also contained in the shaver container, is permanently connected in charging relation to the battery, and is adapted for connection to an external alternating power source to permit periodic recharging of the battery, while the latter remains mounted in its usual operating position.

It is also desirable to incorporate in the appliance container mechanism which permits the appliance operating device, such as the shaver driving motor, to be selectively energized from either its self-contained battery or, alternately, from an external source of similar power with minimal change in the circuit interconnections of the components encased within the appliance container.

It is, therefore, an object of this invention to provide for such electrical appliances of the portable type improved power and control mechanism which permits charging of a self-contained battery from an external alternating power source by means of charging apparatus incorporated in the appliance housing and to which the battery is permanently interconnected, and which mechanism, alternately, permits energization of the appliance operating device selectively from the battery and from an external source of unidirectional power.

In carrying out the invention, there is housed in a shaver container three input terminals for the appliance, a direct current driving motor, a rechargeable battery for energizing the motor, apparatus for converting alternating power applied to a first and second of such input terminals to unidirectional power at a safe level for charging such battery to which the output of the power converter is permanently connected, and a manual three position switch having a movable contact and two stationary contacts with a normally open position. The movable contact is connected to a terminal of the motor, while the other motor terminal is connected to one side of the battery and thence directly to the third input terminal of the appliance. One of the stationary contacts is connected to the other side of the battery to allow the motor to be connected by the switch across the battery for energization. The other stationary contact is connected directly to the first appliance input terminal, permitting the switch to connect the motor directly across the first and third appliance input terminals in a circuit bypassing the battery and its power converter to allow the motor to be energized by unidirectional power applied to the first and third input terminals from an external power source.

A power pack in a separate container is also provided for converting alternating power to unidirectional power of the proper magnitude for energizing the shaver motor when the output of the power pack is connected to the aforementioned "bypassing" circuit via the aforementioned first and third appliance input terminals.

Connected in series with the power converter and the first appliance input terminal is a current limiting resistor of an ohmic value selected to prevent damage to the power converter, under conditions where the power pack output is applied to the appliance input terminals while the motor is connected across the battery.

Features and advantages of the invention will be seen from the above and from the following description of operation when considered in conjunction with the drawing and from the appended claims.

In the drawings:

FIG. 1 is a simplified schematic illustration of an electric dry shaver embodying the invention;

FIG. 2 is a simplified schematic illustration of a power pack for supplying unidirectional power to the shaver of FIG. 1, when the power pack is supplied with alternating power from an external source;

FIGS. 3 and 4 schematically illustrate power cords for use with the apparatus of FIGS. 1 and 2;

FIG. 5 is simplified schematic wiring diagram of the circuit for the shaver of FIG. 1; and FIG. 6 is a simplified schematic wiring diagram of the circuit for the power pack of FIG. 2.

For convenience, the subject invention will be described as applied to an electric dry shaver, it being understood, nevertheless, that the invention is not so limited and without departing from the spirit and scope thereof is applicable to similar electrical appliances.

Referring to FIG. 1, a shaver, generally designated 10, is housed in a container 12 and includes a cutter assembly 14 actuatable by a direct current driving motor M, two rechargeable batteries B for energizing motor M and power converting apparatus CA for charging batteries B from an alternating power source external to the shaver, such as from the usual household AC outlet. Shaver 10 is also provided with three recessed male prongs, designated ST1, ST2, and ST3, and a manual switch KS; the electrical components being interconnected as shown in the circuit of FIG. 5.

In the circuit of FIG. 5, MR designates the rotor of the shaver driving motor, while PMF designates its permanent magnet field. Switch KS has two stationary contacts and a movable contact which may be moved from a normally open midposition into engagement with either of the stationary contacts. One terminal of motor rotor MR is connected to the negative (−) temrinal of a battery B which represents the two rechargeable batteries of the shaver connected in series. The positive terminal (+) of battery B is connected directly to one stationary contact of manual switch KS while the other stationary contact is connected directly to first input terminal ST1 of the shaver.

Power converter CA of FIG. 1 includes a full wave bridge type rectifier V having an input terminal connected through a current-limiting resistor R2 to first input terminal ST1, while its other input terminal is connected through a voltage-limiting capacitor C to second input terminal ST2. A resistor R1 is connected across input terminals ST1, ST2, and provides a discharge path for capacitor C through rectifier V, under conditions where alternating power applied to the converter input is disconnected from input terminals ST1, ST2. The output terminals (+, −) of rectifier V are connected with proper polarity permanently across battery B.

The third input terminal ST3 of the shaver is connected directly to the common junction of the negative terminals (−) of battery B, rectifier V and motor rotor R.

In FIG. 2, a power pack, generally designated 16, is housed in a casing 18 and comprises a manual switch KS1, a pair of protruding male prongs M1, M2, adapted for insertion into a standard household AC power outlet, a pair of recessed electrical male terminals, designated PT1, PT3, a transformer TR and a full wave rectifier V1.

In the circuit of FIG. 6, transformer TR is provided with a primary winding TRP, having three input taps T1, T2, and T3, and a secondary winding TRS. Switch KS1 is provided with a movable contact connected through a current-limiting resistor R3 to input prong M1 of the power pack. The other input prong M2 of the power pack is connected directly to one side of primary winding TRP. Switch KS1 is actuatable to connect input prong M1 selectively to transformer taps T1, T2, T3 in accordance with the magnitude of the voltage of the alternating power applied to prongs M1, M2, such that power pack 16 may supply unidirectional power at a substantially constant voltage magnitude at its output terminals PT1, PT3 for energizing motor rotor MR (FIG. 5). Power pack 16 (FIG. 6) is thus connectable to alternating power sources of various voltage magnitudes, such as for example 250 volts, 160 volts and 110 volts, as is common in some localities.

Secondary winding TRS of the transformer is connected at its opposite ends and by a midtap to the input of full wave rectifier V1. When energized, transformer TR applies alternating power at a proper voltage magnitude to the input of rectifier V1 which converts the power to pulsating direct current power and makes it available at output terminals PT1, PT3.

In FIG. 3, A1 designates a flexible, two conductor power cord terminating at one end in a male plug MS having two prongs M3, M4 adapted for insertion into a standard AC power outlet, and at its other end in a female plug SF having three terminal receiving sockets SF1, SF2 and SF3; sockets SF1 and SF2 being electrically interconnected through the two power cord conductors to prongs M3, M4, respectively. Female plug SF is configurated to receive in sockets SF1, SF2, SF3 the recessed terminals ST1, ST2, ST3 (FIGS. 1 and 5), respectively, of shaver 10.

In FIG. 4, flexible two conductor power cord A2 is terminated at its left end in a female plug assembly PF having two sockets PF1, PF3 adapted for receiving recessed male terminals PT1, PT3 (FIGS. 2 and 6), respectively, of power pack 16. Power cord A2 is terminated at its other end in another female plug assembly SFP having three terminal receiving sockets SFP1, SFP2 and SFP3 configurated for receiving recessed male terminals ST1, ST2, ST3 (FIGS. 1 and 5), respectively of shaver 10. Sockets SFP1 and SFP3 (FIG. 4) are electrically interconnected through the two conductors of the power cord to sockets PF1, PF3, respectively.

It may be noted that the male and female plug and receptacle assemblies of the apparatus are of a nonsymmetrical type so that power cords A1 and A2 may interconnect the apparatus only as has been stated.

In one tested embodiment of a dry shaver equipped with a direct current motor energizable at approximately 2.5 volts, proper operation was obtained with resistor R2 (FIG. 5) at 15 ohms, capacitor C at 1.5 microfarads and resistor R1 at 330 kilohms.

Assume that it is desired to operate shaver 10 (FIG. 1) from its self-contained rechargeable batteries B. Under such conditions, the movable contact of manual switch KS (FIG. 5) is actuated downward, connecting battery B across motor rotor MR, thereby energizing the shaver motor at approximately 2.5 volts for operation.

Next assume that it is desired to recharge batteries B. Under such conditions, manual switch KS (FIG. 5) is returned to its normally open midposition (shown in FIG. 5), and flexible power cord A1 (FIG. 3) used to connect the battery charging circuit of the shaver to any standard household AC power outlet which supplies alternating power at a frequency of from 50 to 60 cycles per second and at a voltage magnitude of from 110 to 250, say, for example, at 110 volts, 60 cycles. This is accomplished by inserting female plug assembly SF of power cord A1 into the recessed male socket of shaver 10 (FIG. 1). Next, male plug MS of the power cord is inserted into the 110 volt AC power outlet, applying alternating power at 110 volts through the power cord to input terminals ST1, ST2 (FIGS. 1 and 5) of shaver 10.

This alternating power is applied through voltage limiting capacitor C and current limiting resistor R2 to the input of full wave rectifier V; capacitor C effectively reducing the magnitude of the voltage of the applied alternating power to a proper charging level. Rectifier V converts the alternating power to pulsating direct power and applies this rectified power over its output terminals (+, −) at the correct polarity to battery B, charging the battery.

When battery B has been charged sufficiently, power cord A1 is disconnected from shaver 10 which may again be operated from its self-contained rechargeable battery B. Resistor R1 connected across shaver input terminals ST1, ST2 allows capacitor C to discharge through rectifier V when power cord A1 is disconnected, thereby preventing shock hazard to a person contacting terminals ST1, ST2.

Next assume that a person, while shaving with shaver 10, becomes aware that shaver batteries B (FIG. 1) are supplying insufficient power to shaver motor M and require recharging. However, such person desires to complete his shave prior to recharging the shaver batteries. Under such conditions, the input of power pack 16 (FIGS. 2, 4) is supplied with alternating power by inserting male prongs M1, M2 of the power pack into a standard household AC outlet, for example, say an outlet supplying alternating power at 110 volts, 60 cycles. Next, power cord A2 (FIG. 4) is used, as has been previously described, to connect output terminals PT1, PT3 (FIGS. 2, 6) of power pack 16 to shaver input terminals ST1, ST3 (FIGS. 1, 5), respectively.

Switch KS1 (FIG. 6) is then actuated to apply the 110 volt alternating power across primary winding TRP of transformer TR via tap T1. The transformer reduces the voltage magnitude to the proper level for operation of the shaver motor, approximately 2.5 volts, and applies such power to full wave rectifier V for conversion to pulsating direct power. This rectified power is applied to shaver input terminals ST1, ST3 (FIG. 5) through power cord A2 (FIG. 4) at the proper polarity for energizing motor rotor MR (FIG. 5). The user then actuates switch KS1 upward, connecting input terminals ST1, ST3 to rotor MR, thereby energizing shaver motor M (FIG. 1) from the external AC power outlet and enabling the user to complete his interrupted shave without having to wait for the shaver batteries to first be recharged.

It may be noted that, should alternating piwer at 160 or 250 volts be available, rather than 110 volts, to operate the shaver through the power pack, switch KS1 (FIG. 6) may be actuated to energize increased portions of primary winding TRP of transformer TR through taps T2, T3.

Upon completion of his shave, assume that the user actuates switch KS1 (FIG. 5) to its normally open midposition, preparing battery B for recharging operation. Power cord A2 (FIG. 4) is then disconnected from shaver 10 (FIG. 5) and power cord A1 connected to the shaver, as was described previously, to recharge battery B through its self-contained charging circuit (rectifier V, capacitor C, resistors R1, R2) from an AC power outlet.

It may be noted that, should switch KSI (FIG. 5) be inadvertently actuated to connect motor rotor R across battery B under conditions where power pack 16 (FIG. 6) is suplying direct power to shaver input terminals ST1, ST3, the impedance of resistor R2 prevents the flow of current of a damaging magnitude through rectifier V. Resistor R2 is also selected of an ohmic value which permits the resistor to act as a "fuse resistor" under conditions where capacitor C becomes defective.

It is seen that the subject invention provides electrical power and control means for a relatively small, portable direct current appliance which includes a self-contained rechargeable battery and its charging circuit in the same casing as the appliance operating motor. Circuitry is also included in the appliance casing to permit energization of the operating motor from an external power source. The subject mechanism allows transfer between the aforementioned operating and charging modes with minimal switching.

As changes can be made in the above described construction and many apparently different embodiments of this invention can be made without departing from the scope thereof, it is intended that all matter contained in the above description or shown on the accompanying drawing shall be interpreted as illustrative only and not in a limiting sense.

What is claimed is:

1. A portable electrical appliance comprising, in a first casing, a power consuming load unit, and in a second casing, a power pack for supplying power to said power consuming unit; wherein there is provided in said load unit casing: an operating device, a replenishable unidirectional power supply for supplying power to said operating device, power converting means adapted for connection to an external source of alternating power for converting said alternating power to unidirectional power of a character for replenishing said unidirectional power supply, a bypass circuit for electrically bypassing said power converting means and said replenishable power supply, and a manual switch having a normally open position and operable to a pair of spaced closed positions; said switch in said normally open position preparing a circuit for replenishment of said unidirectional power supply by said power converting means, said switch in the first closed position adapted to connect said operating device to said replenishable power supply for energization, and in the second closed position to close said bypass circuit; and wherein said power pack includes means for converting alternating power to unidirectional power of a character for energizing said operating device of said load unit, said power pack being provided with means for connecting the input of its power converting means to an external source of alternating power; and wherein there is provided means for connecting the output of said power pack to said bypass circuit of said load unit for electrically connecting said power pack to said operating device for supplying power thereto in said second closed position of said switch.

2. Power and control mechanism for a portable electrical appliance, including in one casing: a driving motor energizable by unidirectional power of a certain magnitude, a replenishable battery for supplying said certain magnitude power to said motor, charging apparatus for said battery, said charging apparatus having first and second appliance input terminals for receiving applied alternating power from a source external to said casing, said charging apparatus converting said applied alternating power to unidirectional power of a character for charging said battery, said charging apparatus also having output terminals connected directly across said battery for applying said converted power to said battery for charging the latter; said appliance being provided with a third input terminal electrically connected to the negative pole of said battery, and circuit interconnecting means including a manually operable switch having movable contact means and a pair of spaced stationary contacts, said movable contact means electrically interconnected to an input terminal of said driving motor, a first one of said stationary contacts being electrically interconnected to said battery and the other of said stationary contacts being electrically interconnected to said appliance first input terminal, said movable contact means being selectively operable for engagement with said first stationary contact for connecting said driving motor across said battery for energization therefrom, and alternately with said other stationary contact to establish a circuit across said first and third input terminals of said appliance electrically bypassing said battery and charging apparatus for energizing said driving motor from unidirectional power of said certain magnitude applied to said first and third input terminals from a source of unidirectional power external to said casing, and said movable contact means in said open position opening said circuits to said driving motor permitting connection of said first and second input terminals to the external source of alternating power for supplying power to said charging apparatus for replenishing the power supply of said battery.

3. Power and control mechanism as set forth in claim 2 wherein said charging apparatus includes a full wave bridge type rectifier having a pair of input terminals and a pair of output terminals connected across said battery, and further includes a voltage limiting capacitor connected in series between one of said rectifier input terminals and the second of said appliance input terminals for limiting the voltage magnitude of said applied alternating power to a certain level, and also includes a current limiting resistor connected between the other input terminal of said rectifier and said first input terminal of said appliance, said current limiting resistor being selected as having electrical impedance characteristics for preventing the application of power of a damaging magnitude to said power converting means under conditions where said unidirectional power of said certain magnitude from the external source is applied to said first and third appliance input terminals while said movable contact means is engaged with said first stationary contact.

4. Power and control mechanism as set forth in claim 2 in which there is provided, in a second casing, a power pack for supplying said certain magnitude energizing power to said driving motor, and wherein there is also provided electrical interconnecting means for electrically connecting said power pack to said first and third appliance input terminals at only the proper polarity.

5. Power and control mechanism as set forth in claim 4 wherein said power pack includes a transformer having a primary and a secondary winding, and includes full wave rectifying means for converting alternating power to unidirectional power, said power pack having two output terminals, a first one of which is electrically interconnected to a midtap of said secondary winding, said rectifying means including two unidirectional current conducting means connected at their respective outputs in common to the other of said power pack output terminals, one of said current conducting means being connected at its input to one end of said secondary winding and the other of said current conducting means being connected at its input to the opposite end of said secondary winding, and wherein said primary winding is arranged for connection to an external alternating source of power.

6. Power and control mechanism as set forth in claim 5 wherein means are provided for selectively connecting certain predetermined portions of said primary winding to said external alternating source of power.

7. Power and control mechanism as set forth in claim 5 wherein said primary winding of said power pack is multitapped, and wherein there is provided switching means for selectively connecting selected ones of said taps to said external alternating power source for energizing said transformer from any of several certain power sources having differing voltage magnitudes.

8. In combination, a portable electrical appliance housed in a first casing and including: a driving motor, a replenishable battery for supplying energizing unidirectional power at a predetermined voltage magnitude to said motor, means for converting alternating power to unidirectional power of a predetermined character for replenishing said battery, and single pole double throw manual switch having a normally open midposition, said appliance having three electrical input terminals; said power converting means having an input connected to a first and a second one of said appliance input terminals for receiving alternating power applied to said first and second appliance terminals and having output terminals electrically interconnected to said battery for supplying said unidirectional replenishing power thereto; said motor having two input terminals, a first one of which is electrically interconnected to one side of said battery; said switch including a movable contact and two stationary contacts, said movable contact being electrically interconnected to the other input terminal of said motor, a first one of said stationary contacts being electrically interconnected to the other side of said battery and the other of said stationary contacts being electrically interconnected to said appliance first input terminal; the third of said appliance input terminals being electrically interconnected directly to said one side of said battery, and housed in a second casing a power pack for supplying unidirectional power to said motor, said power pack having two output terminals electrically connectable to said first and third appliance input terminals, said power pack including means for converting alternating power to unidirectional power at a voltage magnitude for energizing said motor, and a first power cord adapted for interconnecting said output of said power pack to said appliance first and third input terminals for energizing said motor under conditions where said movable switch contact is engaged with said other stationary contact; and a second power cord adapted for connecting said first and second appliance input terminals to an external alternating power source for supplying power for charging said battery under conditions where said switch is in its said normally open position.

9. Power and control mechanism as set forth in claim 8 wherein there is provided impedance means connected between said first appliance input terminals and said input of said power converting means, said impedance means being selected as having electrical impedance characteristics for preventing the application of power of a damaging magnitude to said power converting means, under conditions where said power pack output is applied to said first and third appliance input terminals while said movable contact is engaged with said first one stationary contact of said switch.

References Cited
UNITED STATES PATENTS

| | | | |
|---|---|---|---|
| 3,027,507 | 3/1962 | Hubner | 320—2 |
| 3,089,071 | 5/1963 | Hartwig | 310—47 X |

OTHER REFERENCES

German application 1,051,163, Feb. 19, 1959.

JOHN F. COUCH, *Primary Examiner.*